United States Patent
Doniga-Crivat et al.

(10) Patent No.: US 9,475,372 B2
(45) Date of Patent: Oct. 25, 2016

(54) SEALING PROFILE

(71) Applicant: Cooper Standard GmbH, Lindau / Bodensee (DE)

(72) Inventors: Mircea Doniga-Crivat, Lindau (DE); Thomas Demmel, Munich (DE)

(73) Assignee: Cooper Standard GmbH, Lindau (DE)

( * ) Notice: Subject to any disclaimer, the term of this patent is extended or adjusted under 35 U.S.C. 154(b) by 0 days.

(21) Appl. No.: 14/431,879

(22) PCT Filed: Dec. 19, 2013

(86) PCT No.: PCT/EP2013/077442
§ 371 (c)(1),
(2) Date: Mar. 27, 2015

(87) PCT Pub. No.: WO2014/131480
PCT Pub. Date: Sep. 4, 2014

(65) Prior Publication Data
US 2015/0239329 A1 Aug. 27, 2015

(30) Foreign Application Priority Data
Feb. 26, 2013 (DE) .................. 10 2013 101 896

(51) Int. Cl.
*B60J 10/04* (2006.01)

(52) U.S. Cl.
CPC ............. *B60J 10/04* (2013.01); *B60J 10/17* (2016.02); *B60J 10/27* (2016.02); *B60J 10/277* (2016.02); *B60J 10/50* (2016.02); *B60J 10/74* (2016.02); *B60J 10/763* (2016.02)

(58) Field of Classification Search
CPC B60J 10/008; B60J 10/0011; B60J 10/0065; B60J 10/088; B60J 10/0062; B60J 10/04; B60J 10/0094
USPC ............ 49/483.1, 484.1, 489.1, 490.1, 495.1
See application file for complete search history.

(56) References Cited

U.S. PATENT DOCUMENTS 5,038,521 A * 8/1991 Andrzejewski ...... B60J 10/0011
428/122
5,743,047 A * 4/1998 Bonne ..................... B60J 10/00
49/441

(Continued)

FOREIGN PATENT DOCUMENTS

DE 10200809 A1 11/2003
DE 102008053870 A1 7/2009

(Continued)

OTHER PUBLICATIONS

International Search Report from PCT/EP2013/077442, dated Mar. 7, 2014.

(Continued)

*Primary Examiner* — Justin Rephann
(74) *Attorney, Agent, or Firm* — Thomas B. Ryan; Harter Secrest & Emery LLP

(57) ABSTRACT

A sealing profile for a windowpane of a motor vehicle comprises a receiving section, a bottom lip and a supporting section. The receiving section essentially is U-shaped in cross section and has a first leg, a second leg and a base connecting the first leg and the second leg to each other. The supporting section, in the closed position, supports the bottom lip at the base. The bottom lip comprises a first end, which is arranged at the first leg, a second end, which is free, and a curved contact surface, which is arranged between the first and the second end. The contact surface form-fittingly encompasses a front face of the windowpane in the closed position. The bottom lip a cam section, which is adjacent to the contact surface and which prevents the windowpane from moving in a direction perpendicular to a lateral surface of the windowpane.

16 Claims, 3 Drawing Sheets

(56) References Cited

U.S. PATENT DOCUMENTS

| | | | |
|---|---|---|---|
| 5,779,956 A * | 7/1998 | Hollingshead | B29C 45/14409 264/138 |
| 6,082,048 A * | 7/2000 | Backes | B60J 10/0005 49/377 |
| 6,205,712 B1 * | 3/2001 | Ellis | B60J 10/0051 49/377 |
| 6,493,992 B2 * | 12/2002 | Goto | B60J 10/0051 49/441 |
| 6,612,074 B1 * | 9/2003 | Kaye | B60J 10/0051 296/146.2 |
| 6,708,450 B2 * | 3/2004 | Tanaka | B60J 10/0008 49/441 |
| 6,817,651 B2 * | 11/2004 | Carvalho | B60J 10/0005 296/146.15 |
| 7,014,195 B2 | 3/2006 | Graf | |
| 8,166,708 B2 * | 5/2012 | Ellis | B60J 5/0402 49/441 |
| 8,434,267 B2 * | 5/2013 | Bocutto | B60J 10/0022 296/93 |
| 8,978,306 B2 * | 3/2015 | Prater | B60J 10/0051 49/440 |
| 9,061,574 B2 * | 6/2015 | Ertl | B60J 10/0051 |
| 2005/0120634 A1 * | 6/2005 | Drivon | B60J 10/0005 49/475.1 |
| 2006/0064936 A1 * | 3/2006 | Shiraiw | B60J 10/0005 49/441 |
| 2006/0218865 A1 * | 10/2006 | Tamaoki | B60J 10/0004 494/415 |
| 2006/0248802 A1 * | 11/2006 | Tamaoki | B60J 10/0005 49/441 |
| 2007/0101656 A1 * | 5/2007 | Stipp | B60J 10/0062 49/490.1 |
| 2008/0191517 A1 | 8/2008 | Kreye | |
| 2009/0021044 A1 * | 1/2009 | Maab | B60J 10/04 296/146.2 |
| 2009/0071076 A1 * | 3/2009 | Ludtke | B60J 10/04 49/483.1 |
| 2010/0011670 A1 * | 1/2010 | O'Sullivan | B60J 10/0051 49/489.1 |
| 2010/0077670 A1 * | 4/2010 | Jimenez | B60J 10/0017 49/479.1 |
| 2010/0095599 A1 * | 4/2010 | Coldre | B60J 10/0042 49/484.1 |
| 2011/0061307 A1 * | 3/2011 | Braeuherr | B60J 10/08 494/475.1 |
| 2012/0091746 A1 * | 4/2012 | Zimmer | B60J 10/0022 296/93 |
| 2012/0274102 A1 * | 11/2012 | Ertl | B60J 10/0051 296/201 |
| 2013/0074417 A1 * | 3/2013 | Kawai | B60J 10/083 49/490.1 |
| 2013/0232881 A1 * | 9/2013 | Adachi | B60J 10/0005 49/490.1 |

FOREIGN PATENT DOCUMENTS

| | | | | |
|---|---|---|---|---|
| DE | 102009053937 | A1 | 6/2010 | |
| DE | WO 2010063477 | A1 * | 6/2010 | B60J 10/0051 |
| EP | 1279542 | B1 | 5/2006 | |
| EP | 1935694 | B1 | 9/2009 | |
| EP | 2222491 | B1 | 10/2011 | |
| GB | 2462271 | A | 2/2010 | |
| JP | H0655932 | A | 3/1994 | |
| JP | H08318740 | A | 12/1996 | |
| JP | 2010052462 | A | 3/2010 | |
| WO | 2006042492 | A1 | 4/2006 | |

OTHER PUBLICATIONS

EPC Rule 71(3) Communication of the intention of the European Patent Office to grant a patent dated Apr. 16, 2015 together with and English translation of the claims intended for grant.

Notice of Opposition to corresponding European Patent No. 2 785 547 filed by "The Opposer" CQLT SaarGummi Technologies S.a.r.l. on Apr. 8, 2016 with English translation.

Annex 1 within the Notice of Opposition containing Drawing No. DA05804-DA05805.Q of SaarGummi with a copyright of 2011.

Annex 2 within the Notice of Opposition containing an enlarged portion of Drawing No. DA05804-DA05805.Q with a sealing structure apparently drawn in darkened lines.

Annex 3 within the Notice of Opposition containing an enlarged portion of a legend on Drawing No. DA05804-DA05805.Q.

Annex 4 within the Notice of Opposition containing a further enlarged view of the redrawn sealing structure with added annotations.

Annex 5 within the Notice of Opposition containing one of six pages of a Wikipedia entry for a BMW F25 vehicle at https://de.wikipedia.org/wiki/BMW_F2: accessed on Apr. 4, 2016.

Drawing No. 220 505/506 received from BMW's patent division containing a log of changes from Apr. 22, 2010 to Oct. 20, 2011, which drawing has been divided into six sheets that can be arranged to reassemble the original drawing with a seventh sheet providing a view of a sealing structure otherwise broken between two of the six sheets.

\* cited by examiner

SEALING PROFILE

TECHNICAL FIELD

The invention relates to a sealing profile for a movable windowpane of a motor vehicle.

BACKGROUND OF THE INVENTION

Nowadays, movable windowpanes can be found in a plurality of motor vehicles. In this context, sealing the interior space of the vehicle against the vehicle's surroundings, especially against sound, heat/cold and humidity, in a closed position of the pane, is of great importance. In addition, a sealing profile is required to support a windowpane of a motor vehicle by way of vibrational damping, so that, even at higher vehicle speeds, undesired sounds due to vibration of the windowpane will not arise.

EP 1 935 694 B1 discloses a sealing profile for sealing a motor vehicle door against a body of a motor vehicle. For this, several sealing lips having a flocking structure and a bottom lip, which contacts a front face of a windowpane of the motor vehicle in the closed position, are provided. In the closed position, the sealing lips are adjacent to the lateral surfaces of the windowpane, preventing it from being laterally displaced by the sealing lips. The bottom lip has a convexly curved contact surface, which solely contacts the front face of the windowpane, but does not firmly grip it. If for example pressure variations arise due to airflow, a force or at least a force component will act perpendicular to a lateral surface on the windowpane. This force is required to completely become absorbed by the sealing lips in order to prevent displacement and thus vibration of the windowpane and to assure reliable sealing. However, the reset forces of the sealing lips, which, due to their elastic deformation, are applied to the windowpane, are generally not sufficient to prevent said displacement and thus vibration of the windowpane. Moreover, the convex contact surface does not provide support to the front face, so that the windowpane may slide along the bottom lip. Consequently, such a sealing profile is not able to assure reliable sealing and to prevent vibration of the windowpane, which is associated with undesired sounds development. Such a sealing profile is also know from EP 2 222 491 B1.

A sealing profile without sealing lips is known from EP 1 279 542 B1. According to this, a section of the sealing profile of a windowpane is forced into a cavity, such that the windowpane, in a closed position, will be encompassed by this section at both of its lateral surfaces and at the front face and will be held. However, due to the cavities, which are incorporated into the sealing profile, the sealing profile may become elastically deformed, wherein the windowpane will be put in motion again and vibrations as well as undesired sound development associated therewith will arise.

Another possibility for sealing a windowpane by a sealing profile may be seen from DE 102 00 809 A1. This sealing profile is specifically provided for rimless doors, for example on a convertible car. The front face of the windowpane is engaged by the sealing lip. As, in this sealing profile, the sealing lip is movable perpendicular to a lateral surface of the window pane, the windowpane in this case is set in motion together with the sealing lip, what not only results in undesired sounds, but, in this case, will even entail so called additional squelching sounds. This arises from the loosening of two surfaces of elastomeric material, which previously have been pressed together.

Moreover, JP H08 318740 A discloses a sealing strip for a windowpane of a motor vehicle, which comprises a receiving section, which is U-shaped in cross section, and having two legs. The two legs are connected to each other by a base. A bottom lip is provided at the base. A first end of the bottom lip is integrally formed with the base and a second end of the bottom lip is freely movable. In the closed condition, the planar formed contact surface of the bottom lip touches the front side of a windowpane. A supporting section is provided at the base as well. The supporting section is formed for supporting the bottom lip in the closed position at the base. Two sealing lips are arranged at both legs. In the closed condition, the bottom lip will be deformed towards the base and will be curved.

From JP H06 55932 A, a sealing strip may be seen, which has a receiving section having a U-shaped cross section. The receiving section comprises a first leg, a second leg, as well as a base, which connects the first and second leg. A glass cover is connected with the first and the second leg. The glass cover has a glass-receiving surface. A barrier rib is provided adjacent to the glass-receiving surface. In the closed position, the glass cover will be curved towards the base. The glass cover then contacts the front side of the pane.

JP 2010 52462 A discloses a sealing profile for a windowpane of a motor vehicle, which comprises a receiving section, which is formed in a U-shaped manner, and having a first leg and a second leg and a base. A bottom lip is arranged on the base with a first end. A second end of the bottom lip is freely movable. The bottom lip has a curved contact surface. The contact surface is arranged between the first and the second end and contacts the front face of the windowpane in the closed condition. A supporting projection is provided at the second end of the bottom lip between the bottom lip and the base. The supporting projection is able to support the bottom lip in the closed position at the base. In the closed condition, the bottom lip is solely adjacent to the front face of the windowpane, and a cavity is enclosed by the bottom lip, the base, as well as the supporting projection.

A sealing which is applicable in a motor vehicle, comprising a receiving section, which is U-shaped in cross section, is described in GB 2 462 271 A. The receiving section is formed by a first leg, a second leg and a base. A bottom lip has a first end and a second end. The first end is arranged at the first leg. The second end is freely movable. A contact surface is arranged between the first and the second end and, in the closed condition, touches the front face of the windowpane. A first sealing lip is provided at the first leg and a second sealing lip is provided at the second leg. The first sealing lip has a first sealing section, which is applicable to the first lateral surface. The second sealing lip has a second sealing section, which is applicable to the second lateral surface. The first and second sealing sections are coated with a coating for reducing friction.

Other sealings having a receiving section which is U-shaped in cross section are described in WO 2006/042492 A1, DE 10 2008 053 870 A1 and DE 10 2009 053 937 A1.

SUMMARY OF THE INVENTION

An object underlying the invention is to create a sealing profile for a windowpane of a motor vehicle enabling reliable sealing and preventing undesired sounds associated with vibration of the windowpane during driving.

The invention is based on the finding that displacement of the windowpane perpendicular to a tangent plane of the lateral surfaces will be avoided if the windowpane is stabilized in a nominal position or a construction position.

A sealing profile according to one embodiment of the invention is for a windowpane of a motor vehicle, which is movable between an open position and a closed position and which has a first lateral surface, a second lateral surface and a front face. The sealing profile has a receiving section, which is U-shaped in cross section, as well as a first leg, a second leg and a base connecting the first and second leg to each other. A bottom lip, which has a first end, which is arranged at the first leg, a second end, which is free and has a curved contact surface, which is arranged between the first end and the second end and which form-fittingly encompasses the front face of the windowpane in the closed position, is contained in such a sealing profile. The supporting section, which is provided between the bottom lip and the base, serves to support the bottom lip in the closed position at the base. In this way, the bottom lip has a first cam section, which is adjacent to the contact surface and serves to prevent the windowpane from moving towards a direction perpendicular to a tangent plane of the lateral surface.

With such a sealing profile, the windowpane of the motor vehicle, in the closed position, will be accommodated by the receiving section. The bottom lip is supported by the supporting section opposite of the base and is forced towards the base by the windowpane. Therefore, the contact surface encompasses the windowpane and the windowpane is laterally gripped by the first cam section, creating a form-fit between the bottom lip and the windowpane. Thus, the windowpane is no longer able to move into a direction perpendicular to a tangent plane of a lateral surface. As a result, the windowpane may reliably be sealed and rise of undesired sounds associated with vibration of the windowpane may be avoided. The supporting section is preferably arranged at the base. Alternatively, to this, the supporting section is arranged at the bottom lip. Preferably, the supporting section is adjacent to the first cam section at the side facing away from the contact surface.

In the preferred arrangement of the supporting section form-fitting is increased, since the bottom lip is increasingly forced towards the base and thus is increasingly curved. Consequently, the contact surface fully encompasses the front face and the first cam section will be applied to a lateral surface of the pane. The cam section prevents the windowpane from moving, since, in the nominal or construction position, the windowpane is further stabilized. In this way, reliable sealing may be assured and rise of undesired sounds due to vibration of the windowpane may be avoided.

Further preferably, the contact surface is concavely curved. By way of the concave curvature of the bottom lip form-fitting will further be increased and the windowpane will further be stabilized in the construction position.

Preferably, in the closed position, the bottom lip, the base, the first leg and the supporting section enclose a cavity. The cavity allows the bottom lip to be able to elastically and flexibly move and to accommodate vibrations. By this, the windowpane additionally is supported in a vibration-damped manner.

In a further preferred embodiment, the bottom lip comprises a second cam section adjacent to the contact surface. The second cam section preferably is arranged at the end of the bottom lip, which faces away from the first cam section.

With such a sealing profile, displacement of the windowpane to another direction perpendicular to a tangent plane of the windowpane will also be prevented. The windowpane is thereby stabilized in a construction or nominal position. Consequently, the windowpane may reliably be sealed. In addition, vibration damping is considerably improved, whereby undesired sounds may be avoided.

Preferably, the contact surface is roughened, coated or is fabricated from a friction material, so that the contact surface additionally grips the front face of the windowpane in a force-fitting (friction-fitting) manner. Displacement of the windowpane will additionally be hampered by the additional force-fitting (friction-fitting). Additionally, accommodation of vibrations of the windowpane by the bottom lip will be improved, avoiding rise of undesired sounds.

Especially preferred, the sealing profile comprises a first sealing lip, which is arranged at the first leg, and a second sealing lip, which is arranged at the second leg. The windowpane will be prevented from moving perpendicular to a tangent plane of its lateral surface by the two additional sealing lips. During this, the windowpane will be stabilized in the construction position and rise of undesired sounds will be prevented. Additionally, reliable sealing of the windowpane may be assured.

It is preferred, that the first sealing lip comprises a first sealing section preferably formed in a friction-reducing manner or flocked, which is applicable to the first lateral surface.

It is preferred that the second sealing lip comprises a second sealing section preferably formed in a friction reducing manner or flocked, which is applicable to the second lateral surface.

The flocking of the sealing sections allows easy sliding of the windowpane in or out of the receiving section during closing or opening movement. Furthermore, the windowpane will reliably be sealed and by additional form-fitting occurring of undesired sounds will be avoided.

Preferably, at least one projection avoiding all-over application of the bottom lip to the base is arranged at the base. If the bottom lip is forced against the base by the windowpane, the bottom lip and the base may adhere to each other. As a result, so-called squelching sounds arise if the bottom lip releases from the base. The at least one projection avoids all-over application of the bottom lip to the base and thus rise of the squelching sounds.

Preferably, the sealing profile is fabricated from an elastomer. It is especially preferred for the elastomer to be a thermoplastic elastomer or alternatively an ethylene propylene diene rubber. Preferably, the sealing profile is extruded.

Furthermore preferred, according to the present invention, the sealing profile comprises a decorative element or a trim. In this context, the decorative element is preferably fabricated from metal, such as for example aluminum, or alternatively from an aluminum alloy.

By way of the preferred configuration of the sealing profile the windowpane will be stabilized in the nominal position or construction position. This results in reliable sealing of the interior space of the vehicle against the vehicle's surroundings concerning sound, heat and humidity, independent of the driving speed of the vehicle. Additionally, the windowpane is supported in a vibration-damped manner, thereby avoiding undesired sounds during driving.

Directional information in the description, such as "interior", "exterior", "right", "left", "in front of", "above" and "below" relate to the perspective of a person sitting in the vehicle with a view to the wind screen.

BRIEF DESCRIPTION OF THE DRAWING FIGURES

One executive example of the invention will be explained in the following by way of the attached drawings.

DETAILED DESCRIPTION OF THE INVENTION

Figure 1:
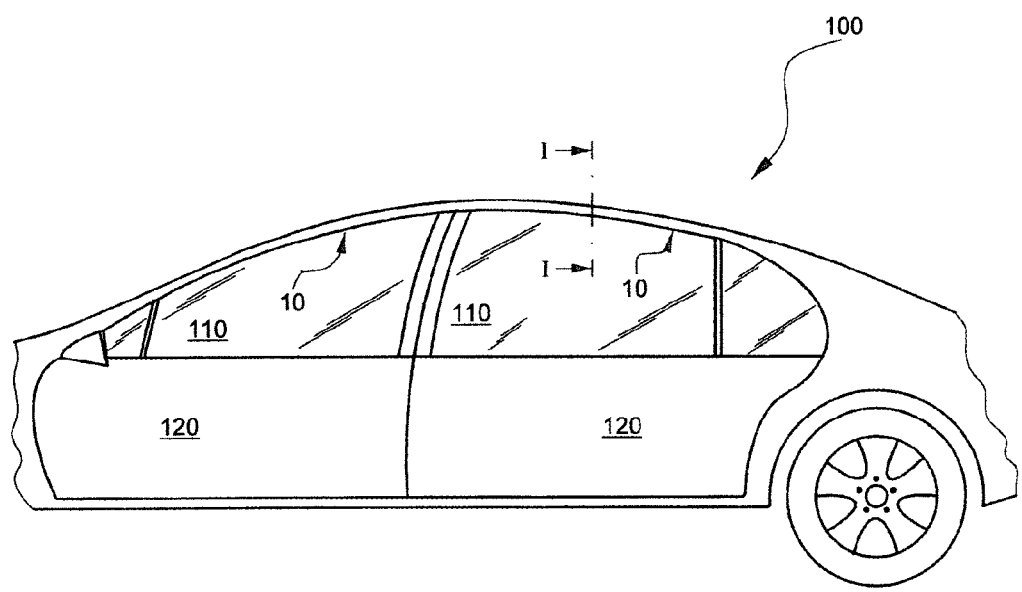
FIG. 1 is a lateral partial view of a motor vehicle.

As can be seen from FIG. 1, a motor vehicle 100 comprises a windowpane 110, a door 120 and a sealing profile 10. The sealing profile 10 is arranged at the upper side of the door 120 of the motor vehicle 100.

Figure 2:
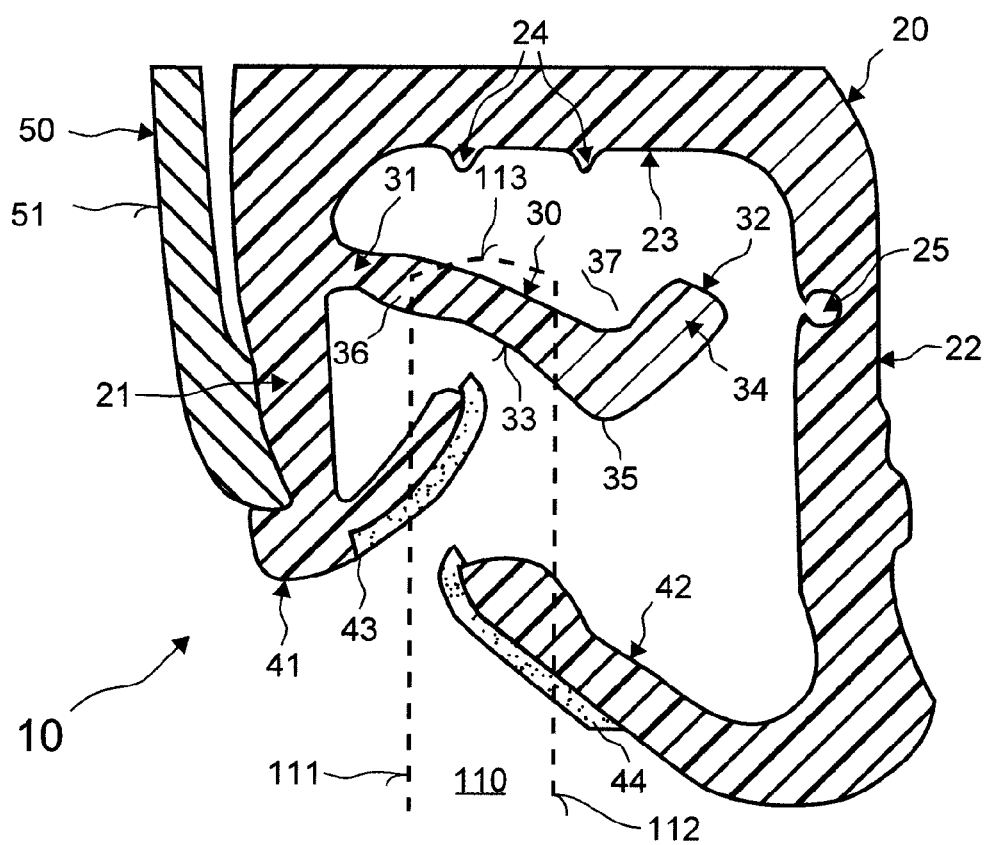
FIG. 2 is a cross section of an executive example of a sealing profile having a windowpane (nominal position is dashed) in an open position.
Figure 3:
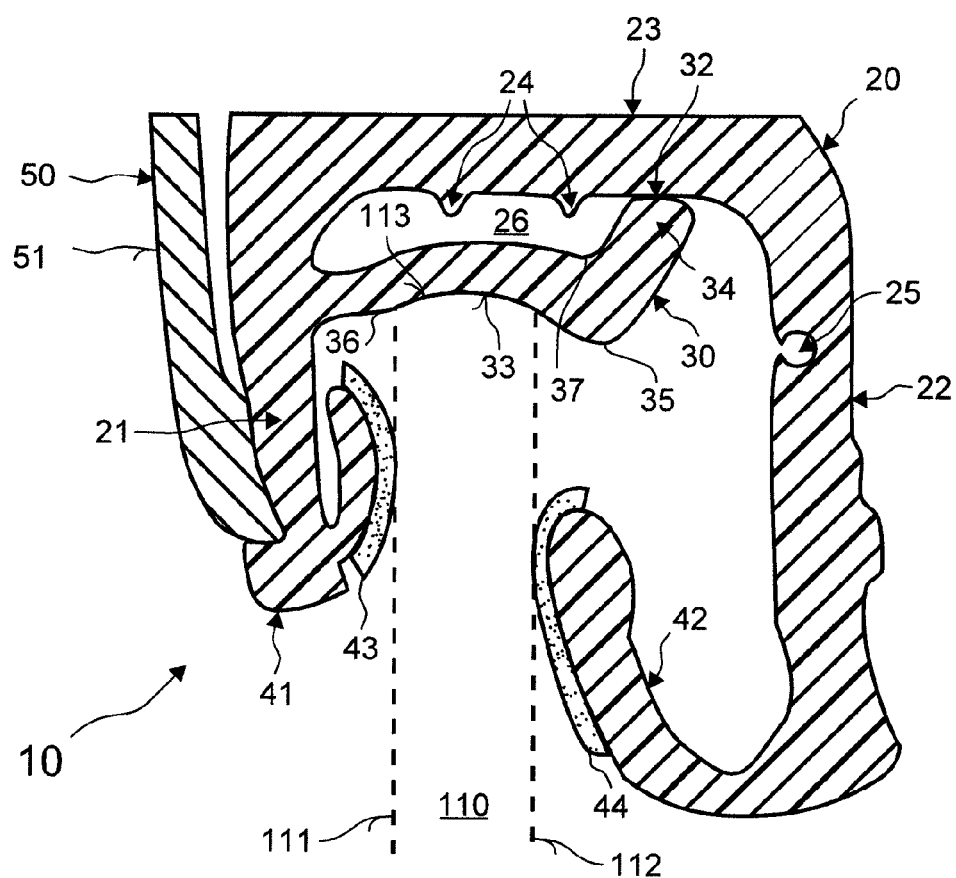
FIG. 3 is a cross section of the executive example of the sealing profile having the windowpane in a closed position (dashed).

As can be seen from FIGS. 2 and 3, the windowpane 110 has a first lateral surface 111 (exterior lateral surface), a second lateral surface 112 (interior lateral surface) and a front face (upper side) 113. The nominal position or construction position of the windowpane 110 is represented in FIGS. 2 and 3 by a dotted line. In the following, the sealing profile 10 will be explained in more detail with the help of a section along the line I-I (FIG. 1).

The sealing profile 10 is extruded of ethylene propylene diene rubber and comprises a receiving section 20, a bottom lip 30, a first sealing lip 41, a second sealing lip 42 and a decorative element 50. The receiving section 20 comprises a first leg 21, a second leg 22 and a base 23. The two legs 21, 22 as well as the base 23 are arranged such that they form a U-shaped cross section.

In the closed position, the receiving section 20 accommodates the front face 113 and part of the windowpane 110. Then, the windowpane 110 is located between the two legs 21, 22. Furthermore, a cavity 26 is formed, which is enclosed by the bottom lip 30, the first leg 21, the base 23 and a supporting section 34 (described further below). In the open position the windowpane 110 is located completely exterior of the receiving section 20.

The first leg 21 has an area, to which the decorative element 50 may be attached, and an area onto which the bottom lip 30 is arranged. The second leg 22 has a groove 25, which is arranged therein extending along the whole sealing profile 10. The groove 25 allows bending of the second legs 22, so that the sealing profile 10 may be attached in an appropriate recess (not shown) at the door 120.

The base 23 has an end section, at which one end of the first leg 21 is arranged, and another end section, at which one end of the second leg 22 is arranged. In this way, the base 23 joins the two legs 21, 22. At least one projection 24 (herein two projections), which projects from a lower surface of the base 23 towards the bottom lip 30, is provided. The projections 24 prevent the bottom lip 30 from being completely forced to the base 23 by the windowpane 110. Upon opening the windowpane 110, the bottom lip 30 moves without the need to be released from the base 23. By this, any undesired noise associated with the releasing process will be avoided.

The bottom lip 30 comprises a first end 31, a second end 32, a contact surface 33, a supporting section 34, a first cam section 35, a second cam section 36 and a bulge 37. The first end 31 of the bottom lip 30 is for example arranged at the first leg 22. The second end 32 of the bottom lip 30 is a free end, i.e. the second end 32 will be moved, when the bottom lip is moved, whereas the first end will rest stationary, except a hinge or rotational movement.

The contact surface 33 is arranged between the first end 31 and the second end 32 and is concavely curved. In this executive example of the present invention the supporting section 34 is formed by the second end 32, but may also be formed as an independent part. The first cam section 35 is arranged at the second end 32 of the bottom lip 30 and abuts the contact surface 33. In the first cam section 35 the bulge 37 is arranged at the side of the bottom lip 30 facing the base 23. Consequently, in this executive example the bottom lip 30 is L-shaped. The second cam section 36 is located near the first end 31 and is adjacent to the first end 31 and the contact surface 33.

The supporting section 34 is arranged at the second end 32 of the bottom lip 30 and, in the closed position, supports the bottom lip 30 at the base 23. If the windowpane 110 is in the closed position (refer to FIG. 3), then the bottom lip 30 will be forced towards the base 23. As the bottom lip 30 is supported by the supporting section 34, it similarly will become curved in the direction of the base 23. During this, the contact surface 33 will similarly become concavely curved from the front face 113 of the windowpane 110. By the curvature of the contact surface 33 the first cam section 35 and the second cam section 36 are put around the front face 113 and are adjacent to both of the lateral surfaces 111, 112. The first cam section 35 and the second cam section 36 thus avoid displacement of the windowpane 110 in a direction perpendicular to a tangent plane of the lateral surface 111, 112. In this way, the windowpane 110 will form-fittingly be gripped and will be stabilized and held in its nominal position.

The cavity 26 is air-filled and supports the windowpane 110 in a vibration damped manner, since, in the case of vibrations of the windowpane 110, the bottom lip 30 will be able to become elastically deformed and accommodate displacement of the windowpane 110. In this executive example, the first sealing lip 41 having a first sealing section 43 and the second sealing lip 42 having a second sealing section 44 each are arranged at the first and second legs 21, 22. For this, both of the sealing sections 43, 44 are formed by flocking.

In the closed position (FIG. 3) both of the sealing lips 41, 42 will become elastically deformed by the windowpane 110. If a force is acting on the windowpane 110, for example due to pressure variations, the sealing lips 41, 42 may accommodate it and may hold the windowpane 110 in its construction position. The flocked sealing sections 43, 44 provide reliable sealing.

The decorative element 50 is made of aluminum and has a shiny surface 51. The decorative element 50 is attached to the first leg 21 by a clamped connection. The surface 51 serves for pleasant esthetic appearance of the sealing profile 10 to an external viewer of the motor vehicles 100.

The sealing profile 10 reliably seals the interior space of the vehicle against the environment of the vehicle, since the specific shape of the bottom lip 30 avoids displacement of the windowpane 110 in an inward or outward direction. In addition to form fitting between the bottom lip 30 and the frontal and lateral surfaces 111, 112, 113, the windowpane 110 is stabilized and held by both of the sealing lips 41, 42 in its construction position. Due to resiliency of the material and due to the cavity 26 formed in the closed position the windowpane 110 is also supported in a vibration-damped manner. Sounds resulting from vibration of the windowpane 110 may thus be avoided.

REFERENCE LIST

10 Sealing profile
20 Receiving section

21 First leg
22 Second leg
23 Base
24 Projection
25 Groove
26 Cavity
30 Bottom lip
31 First end
32 Second end
33 Contact surface
34 Supporting section
35 First cam section
36 Second cam section
37 Bulge
41 First sealing lip
42 Second sealing lip
43 First sealing section
44 Second sealing section
50 Decorative element
51 Surface
100 Motor vehicle
110 Window pane
111 First lateral surface
112 Second lateral surface
113 Front face
120 Door

The invention claimed is:

1. A sealing profile for a windowpane of a motor vehicle, wherein the windowpane is displaceable between an open position and a closed position, and has a first lateral surface, a second lateral surface and a front face, comprising:
   a receiving section having a U-shaped cross section and a first leg, a second leg and a base connecting the first leg and the second leg to each other;
   a first sealing lip being arranged at the first leg, and a second sealing lip being arranged at the second leg;
   a bottom lip having a first end which is arranged at the first leg, a second end which, in the open position, is freely movable, and a curved contact surface, which is arranged between the first end and the second end; and
   a supporting section, which is provided between the bottom lip and the base and which is formed to support the bottom lip at the base in such a manner that the contact surface is concavely curved by the front face in the closed position;
   wherein the bottom lip has a first cam section, which is adjacent to the contact surface at the second end and a second cam section which is adjacent to the contact surface at the first end,
   wherein the first cam section and the second cam section are configured so as to be turned around the front face into positions against the first lateral surface and the second lateral surface, respectively, in the closed position, thereby form-fittingly encompassing the front face and preventing the windowpane from being moved in a direction perpendicular to a tangent plane of the lateral surface,
   wherein the contact surface is concavely curved in the open position and the first and second cam sections have surfaces adjoining the contact surface that are convexly curved in the open position, and
   wherein the contact surface of the bottom lip exhibits an amount of friction with the front face of the windowpane that is larger than an amount of friction exhibited by either of the first and second sealing lips with the respective first and second lateral surfaces of the windowpane to provide a better grip of the front face of the windowpane while allowing easy sliding of the windowpane.

2. The sealing profile according to claim 1, wherein the supporting section is arranged at the bottom lip.

3. The sealing profile according to claim 2, wherein the supporting section is adjacent to the first cam section at a side facing away from the contact surface.

4. The sealing profile according claim 3, wherein the bottom lip, the base, the first leg and the supporting section enclose a cavity in the closed position.

5. The sealing profile according to claim 4, wherein at least one projection is arranged at the base; the at least one projection projecting from the base towards the bottom lip within the cavity to prevent the bottom lip from being forced against the base by the windowpane in the closed position.

6. The sealing profile according to claim 3, wherein the supporting section is formed as a bulge of the bottom lip at the side of the bottom lip facing the base.

7. The sealing profile according to claim 1, wherein the bottom lip, the base, the first leg and the supporting section enclose a cavity in the closed position.

8. The sealing profile according to claim 1, wherein the contact surface is at least one of (a) roughened and (b) coated to relatively increase the amount of friction between the contact surface and the front face of windowpane with respect to the amount of friction between either of the first and second sealing lips and the respective first and second lateral surfaces of the windowpane.

9. The sealing profile according to claim 1, wherein the first sealing lip comprises a first sealing section, which is at least one of (a) formed in a friction reducing manner and (b) flocked and is applicable to the first lateral surface.

10. The sealing profile according to claim 9, wherein the second sealing lip comprises a second sealing section, which is at least one of (a) formed in a friction-reducing manner and (b) flocked and is applicable to the second lateral surface.

11. The sealing profile according to claim 1, wherein at least one projection is arranged at the base; the at least one projection projecting from the base towards the bottom lip to prevent the bottom lip from being forced against the base by the windowpane in the closed position.

12. The sealing profile according to claim 1, wherein the sealing profile is fabricated from an elastomer.

13. The sealing profile according to claim 12, wherein the sealing profile is extruded from an elastomer and the elastomer is at least one of (a) a thermoplastic elastomer and (b) an ethylene propylene diene rubber.

14. The sealing profile according to claim 1, wherein a decorative element is arranged at at least one of (a) the first leg and (b) the second leg.

15. The sealing profile according to claim 1, wherein the second sealing lip comprises a second sealing section, which is at least one of (a) formed in a friction-reducing manner and (b) flocked and is applicable to the second lateral surface.

16. The sealing profile of claim 1 wherein the contact surface of the bottom lip is treated to increase friction with the front face of the windowpane to provide a better grip of the front face of the windowpane and the first and second sealing lips are treated to reduce friction with the respective first and second lateral surfaces of the windowpane and allow easy sliding of the windowpane.

* * * * *